US008882362B2

(12) United States Patent
Shiraishi

(10) Patent No.: US 8,882,362 B2
(45) Date of Patent: Nov. 11, 2014

(54) METHODS FOR OPTICAL DEVICE INCLUDING TRANSPARENT MEMBER AREAS BETWEEN CORE AND CONNECTOR INSERTION HOLE

(71) Applicant: Takashi Shiraishi, Isehara (JP)

(72) Inventor: Takashi Shiraishi, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/184,028

(22) Filed: Feb. 19, 2014

(65) Prior Publication Data

US 2014/0166200 A1 Jun. 19, 2014

Related U.S. Application Data

(62) Division of application No. 13/448,693, filed on Apr. 17, 2012.

(30) Foreign Application Priority Data

Jul. 8, 2011 (JP) .................................. 2011-152282

(51) Int. Cl.
*G02B 6/00* (2006.01)
*G02B 6/38* (2006.01)
*G02B 6/32* (2006.01)

(52) U.S. Cl.
CPC ............ *G02B 6/3861* (2013.01); *G02B 6/3885* (2013.01); *G02B 6/325* (2013.01)
USPC ................. 385/53; 385/77; 156/250

(58) Field of Classification Search
USPC .............................. 385/53, 77, 147
See application file for complete search history.

(56) References Cited

U.S. PATENT DOCUMENTS

| 5,699,464 | A | * | 12/1997 | Marcuse et al. | 385/33 |
| 6,445,939 | B1 | * | 9/2002 | Swanson et al. | 600/342 |
| 6,564,087 | B1 | * | 5/2003 | Pitris et al. | 600/478 |
| 6,724,959 | B1 | * | 4/2004 | Takahashi et al. | 385/33 |
| 2007/0165982 | A1 | * | 7/2007 | Kokkelink et al. | 385/38 |
| 2008/0219624 | A1 | * | 9/2008 | Pimpinella et al. | 385/60 |
| 2009/0180511 | A1 | * | 7/2009 | Muendel | 372/99 |
| 2010/0253949 | A1 | * | 10/2010 | Adler et al. | 356/479 |

(Continued)

FOREIGN PATENT DOCUMENTS

| JP | 3364638 | 11/2002 |
| JP | 2009-258510 | 11/2009 |

OTHER PUBLICATIONS

Restriction Requirement issued Jan. 17, 2014 in related U.S. Appl. No. 13/448,693.
U.S. Appl. No. 13/448,693, filed Apr. 17, 2012 Takashi Shiraishi, Fujitsu Limited.

(Continued)

*Primary Examiner* — Akm Enayet Ullah
(74) *Attorney, Agent, or Firm* — Staas & Halsey LLP

(57) ABSTRACT

An optical device includes a connector configured to provide a hole, an optical waveguide provided with a core and a clad equipped on an outer periphery of the core and configured to have a refractive index smaller than a refractive index of the core, a first transparent member configured to make contact with a core end face of the optical waveguide, and a second transparent member configured to make contact with a hole bottom of the optical waveguide insertion hole, wherein a contact area of the second transparent member and the hole bottom of the optical waveguide insertion hole is larger than a contact area of the core and the first transparent member.

4 Claims, 21 Drawing Sheets

(56) References Cited

U.S. PATENT DOCUMENTS

2010/0284651 A1* 11/2010 Krahenbuhl et al. ............ 385/35
2011/0176779 A1* 7/2011 Kolesar ........................... 385/77
2012/0063720 A1* 3/2012 Wang et al. ..................... 385/28

OTHER PUBLICATIONS

U.S. Office Action issued May 19, 2014 in related U.S. Appl. No. 13/448,693.
Notice of Allowance issued Jul. 14, 2014 in related U.S. Appl. No. 13/448,693.

* cited by examiner

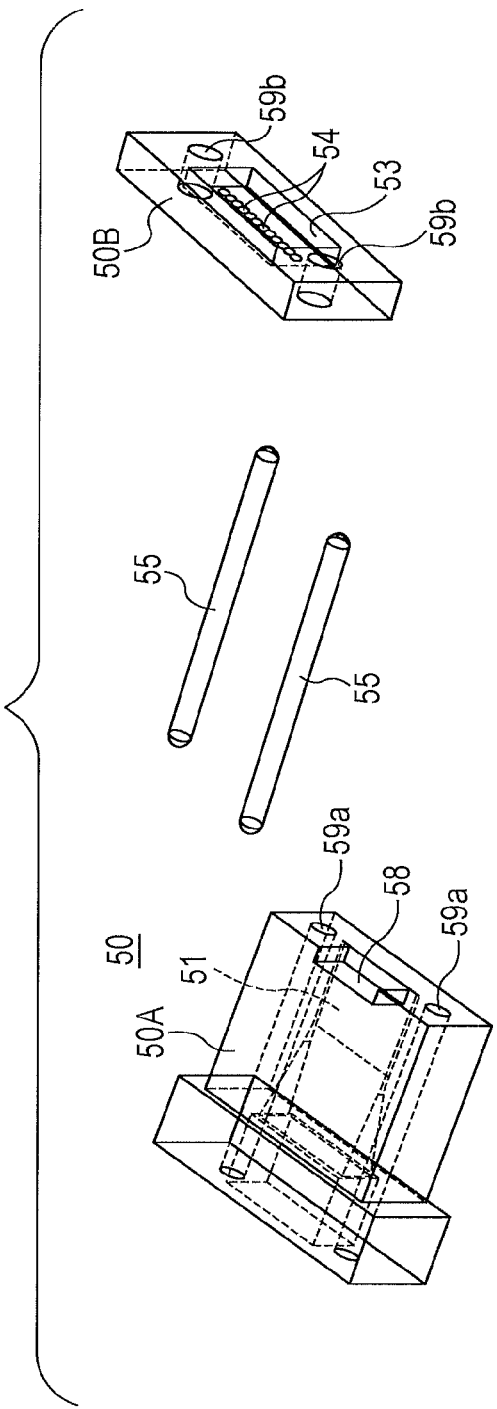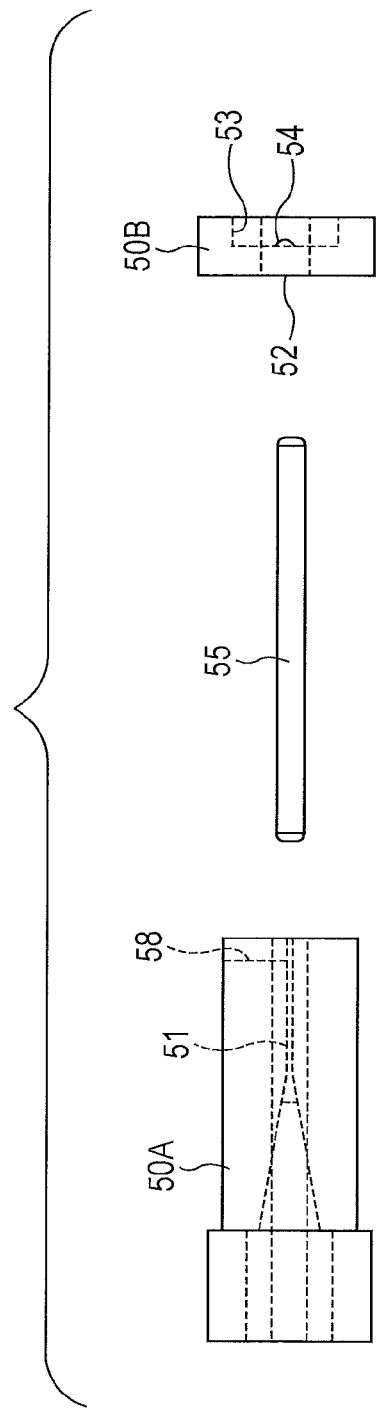

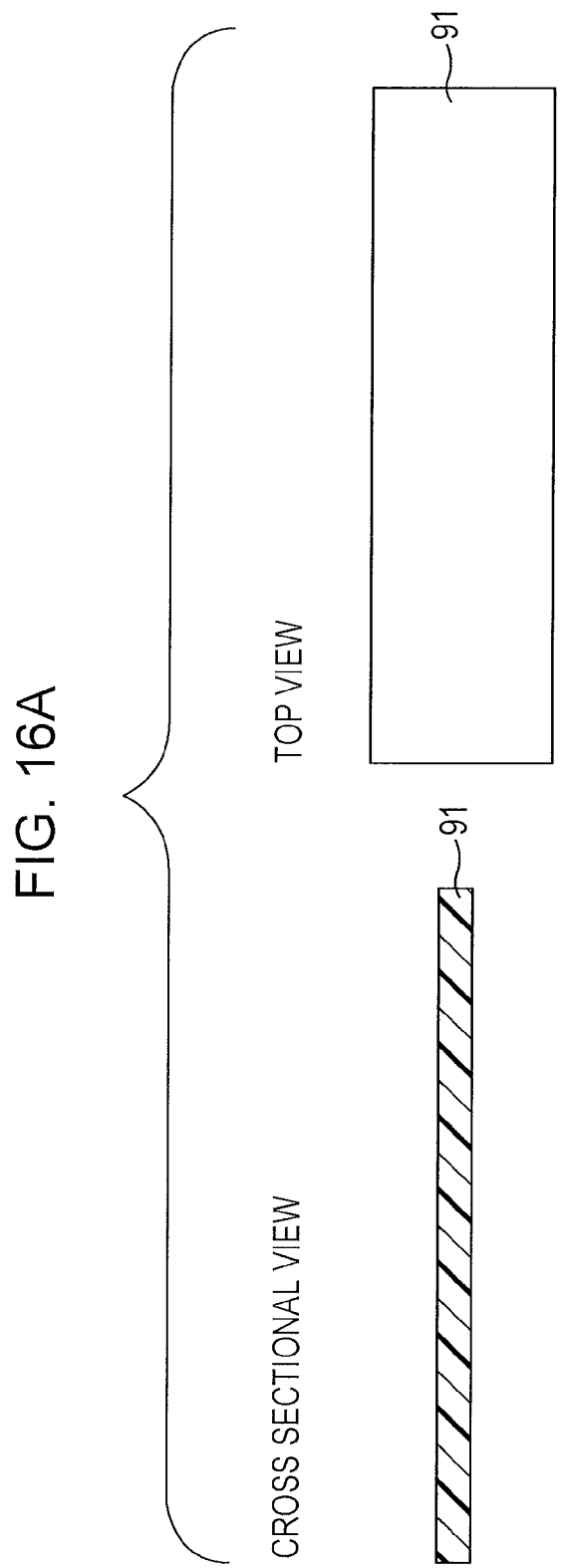

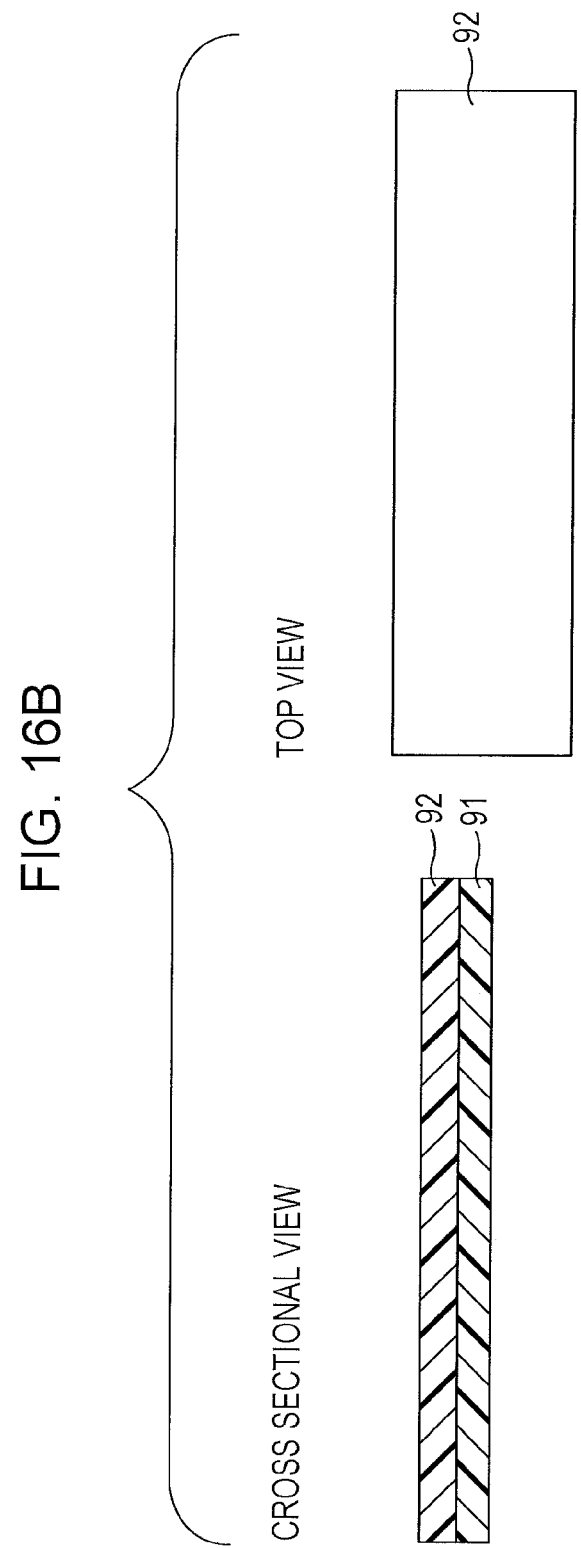

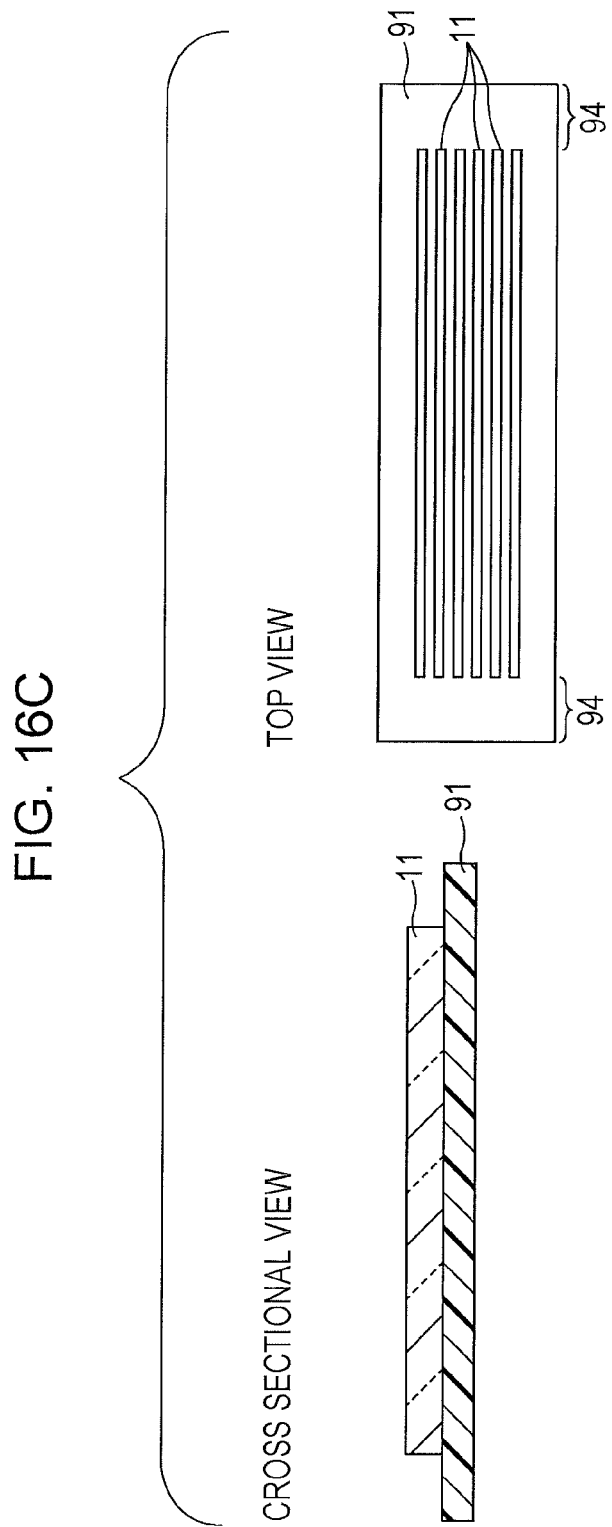

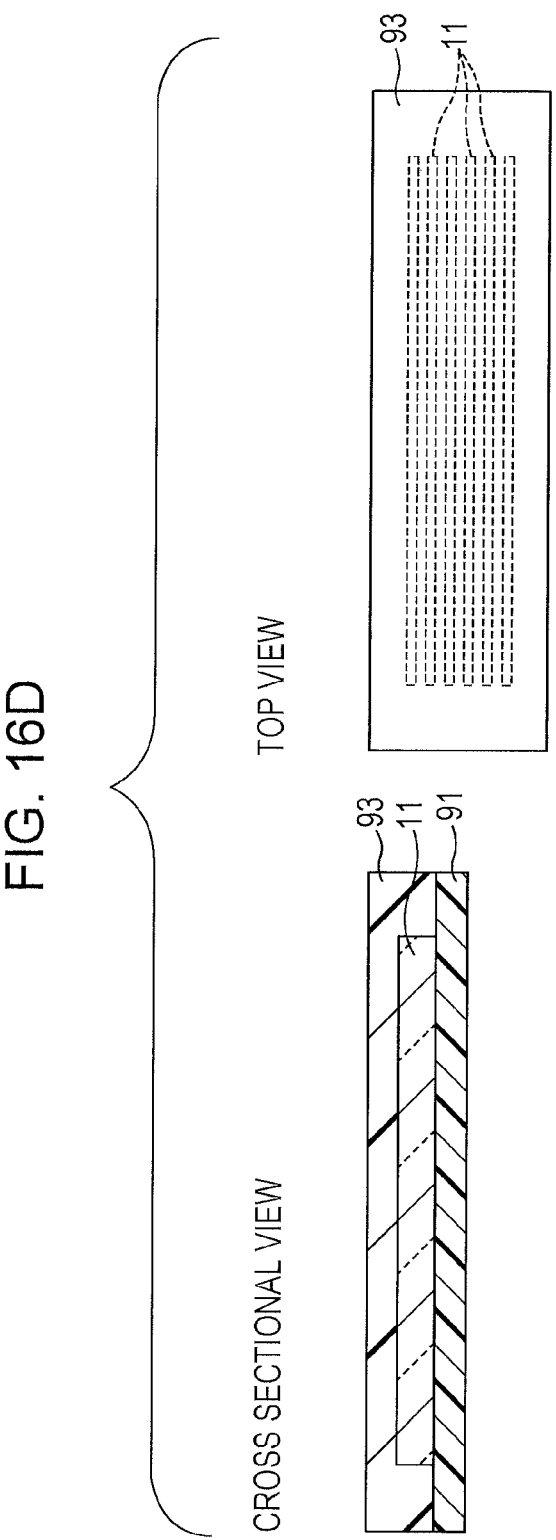

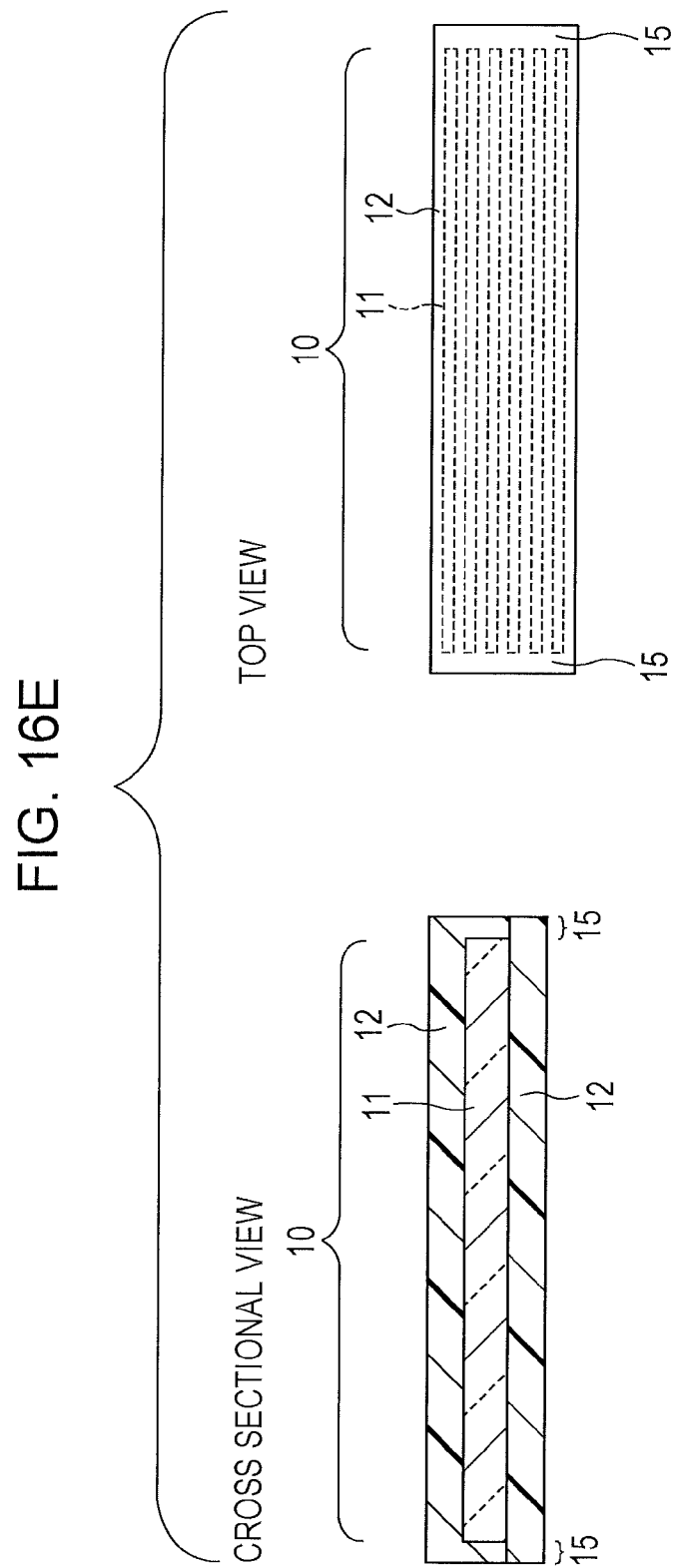

METHODS FOR OPTICAL DEVICE INCLUDING TRANSPARENT MEMBER AREAS BETWEEN CORE AND CONNECTOR INSERTION HOLE

CROSS-REFERENCE TO RELATED APPLICATION

This application is a divisional of U.S. application Ser. No. 13/448,693 filed Apr. 17, 2012, which is based upon and claims the benefit of priority of the prior Japanese Patent Application No. 2011-152282, filed on Jul. 8, 2011, the entire contents of which are incorporated herein by reference.

FIELD

The embodiment discussed herein is related to an optical device and a method of manufacturing an optical device.

BACKGROUND

In recent years, in fields of servers, high performance computers (HPC), and the like, an improvement in performance due to the multi-CPU compatibility dramatically increases the transmission capacity of I/O functions communicating between a CPU and an external interface. Meanwhile, as a related technique, there is a limitation in high speed transmission by an electrical signal from the perspective of occurrence of crosstalk and wiring density. With that, a technique (optical interconnection technology) that achieves high speed I/O with a signal light by disposing a photoelectric transducer is under study.

The number of optical transmission paths used for servers and high end computers is enormous, and the number of optical modules thus used also becomes large. Therefore, modules for optical interconnection are desired to be low in costs in comparison with modules for long distance optical communication.

In an optical interconnector, while the multi-channel parallel optical connection technique is employed for using a VCSEL (vertical cavity semiconductor emission laser) array as a light emitting element and a PD (photo diode) array as a light receiving element in general, there is also an increasing demand for cost reduction to multi-channel optical connectors. In the multi-channel optical connectors, with an increase in the transmission capacity, it is desired to increase the number of channels from the current mainstream 12 channels to 24 channels and further to 48 channels.

As a connector for optical fibers in a related technique, an MT (mechanical transferable) connector is known. An MT connector is achieved by inserting optical fibers into an MT ferrule and aligning the axes to maintain the optical path in a straight line and by polishing end faces of the optical fibers. However, in the step of polishing, a polisher is used and a plurality of polishing sheets is replaced, so that the time and the costs increase. Therefore, it is strongly desired to develop multi-channel optical connectors without polishing.

As a technique to implement optical fibers without polishing, there is a known technique that configures optical connectors with ferrules of a transparent material and presses cut end faces of the optical fibers against a vertical wall formed in the ferrule for implementation (for example, Japanese Laid-open Patent Publication No. 2009-258510). The optical fibers are cut using a fiber cutter. A beam emitted from the optical fibers pressed against the transparent wall has the optical path bent 90 degrees with a concave mirror.

As another example of the no polish implementation technique, there is a known technique that adheres and fixes a fiber optical plate (FOP) to a front face of the ferrule, and then inserts connecting ends of the optical fibers into the ferrule while the end faces are still unpolished and presses the unpolished end faces of the optical fibers against the FOP for connection (for example, Japanese Patent No. 3364638). The FOP used for this method is an optical component made by bundling a large number of optical fibers and stretching them to be sliced thinly.

All of the optical connectors using no polish optical fibers in the related techniques have a configuration of pressing cut end faces of fibers against a wall. When actually manufacturing no polish optical connectors on mass production lines using a related technique, the following problems arise.

Firstly, there is influence of dust collection mixed during ferrule manufacture and assembly. As illustrated in FIG. 1A, when inserting cut no polish optical fibers 113 into a ferrule 121, there is a possibility of mixing dust collection (dust) 105 in the 100 μm order into an insertion hole 122. As illustrated in FIG. 1B, in a case that the optical fibers 113 are pressed against an FOP 130 and the dust 105 is attached on an end face of a core 111, a light passing through the core 111 is scattered at the dust 105 to be a factor of a loss. Although the dust 105 does not mix into in all cases, it is difficult to be thoroughly removed, and in a case that the dust 105 attaches to the core 111 in even one of the plurality of channels, an optical loss occurs in that channel, which makes the entire optical connector defective. As a result, the manufacturing yield decreases. This problem becomes more apparent as the number of channels in an optical connector increases.

Next, when reducing the influence of dust in a no polish connector, it is desired to take measures, such as to carry out the assembly step in a clean room environment. In contrast, in the current mainstream MT connector, the tip ends of the optical fibers are polished after inserting the ferrule, so that the influence of dust does not become a problem and a clean room is not used. Accordingly, a no polish connector takes a lot of equipment investment and becomes disadvantageous in costs compared with the polished MT connector and the like. In a case of a no polish connector, it is difficult to achieve cost reduction if not enabling manufacture in an environment same as the polished connector.

SUMMARY

According to an aspect of the embodiments, an optical device includes a connector configured to provide a hole, an optical waveguide provided with a core and a clad equipped on an outer periphery of the core and configured to have a refractive index smaller than a refractive index of the core, a first transparent member configured to make contact with a core end face of the optical waveguide, and a second transparent member configured to make contact with a hole bottom of the optical waveguide insertion hole, wherein a contact area of the second transparent member and the hole bottom of the optical waveguide insertion hole is larger than a contact area of the core and the first transparent member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 11A and 11B illustrate Modification 2 of a connector main body.

FIG. 16A illustrates a step of manufacturing an optical waveguide provided with a transparent member.

FIG. 16B illustrates a step of manufacturing an optical waveguide provided with a transparent member.

FIG. 16C illustrates a step of manufacturing an optical waveguide provided with a transparent member.

FIG. 16D illustrates a step of manufacturing an optical waveguide provided with a transparent member.

FIG. 16E illustrates a step of manufacturing an optical waveguide provided with a transparent member.

DESCRIPTION OF EMBODIMENT

In this embodiment, an optical device has a configuration of inserting an optical waveguide provided with a core and a clad covering an outer periphery of the core into a connector main body. At a tip end of the optical waveguide in an insertion direction, a transparent member is equipped that covers a core end face. The transparent member includes a first transparent member area on a side covering the core end face and a second transparent member area on a side making contact with, when the optical waveguide is inserted into a connector insertion hole of the connector main body, a hole bottom. The core end face of the optical waveguide is positioned backward from a contact face of the hole bottom and the second transparent member area in the insertion direction by a predetermined distance.

By inserting the transparent member between the core end face and the hole bottom, a light diameter of a signal light on the contact face of the hole bottom is made larger than a light diameter (core diameter) on the core end face. This enables to relatively reduce the influence to the optical loss due to scattering even in a case that dust is mixed onto the contact face.

Figure 2A:
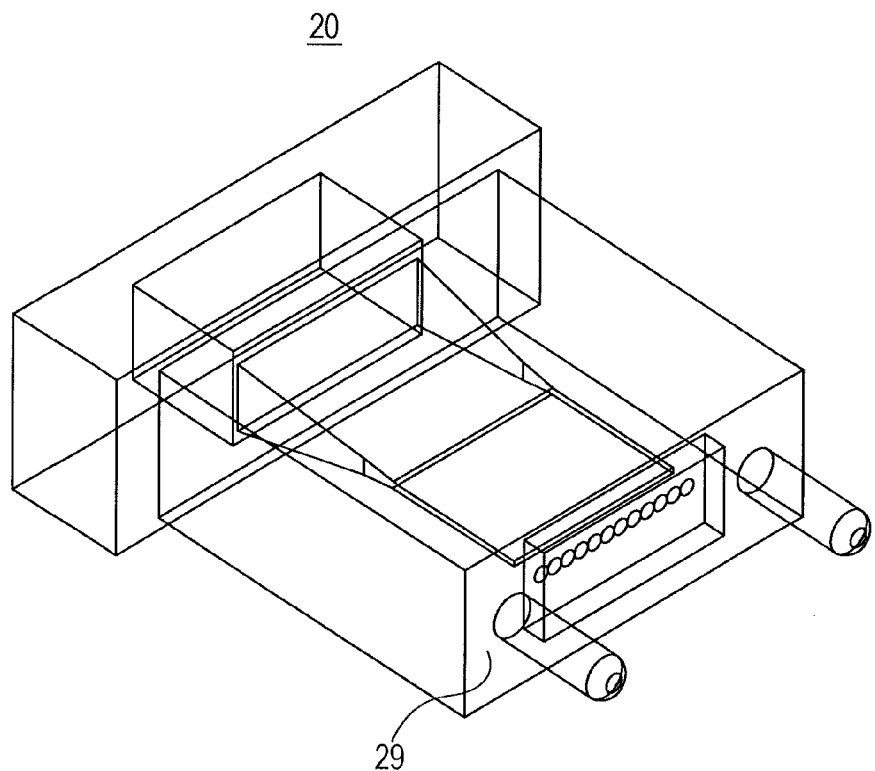
FIGS. 2A and 2B illustrate a connector main body used in an embodiment.
Figure 2B:
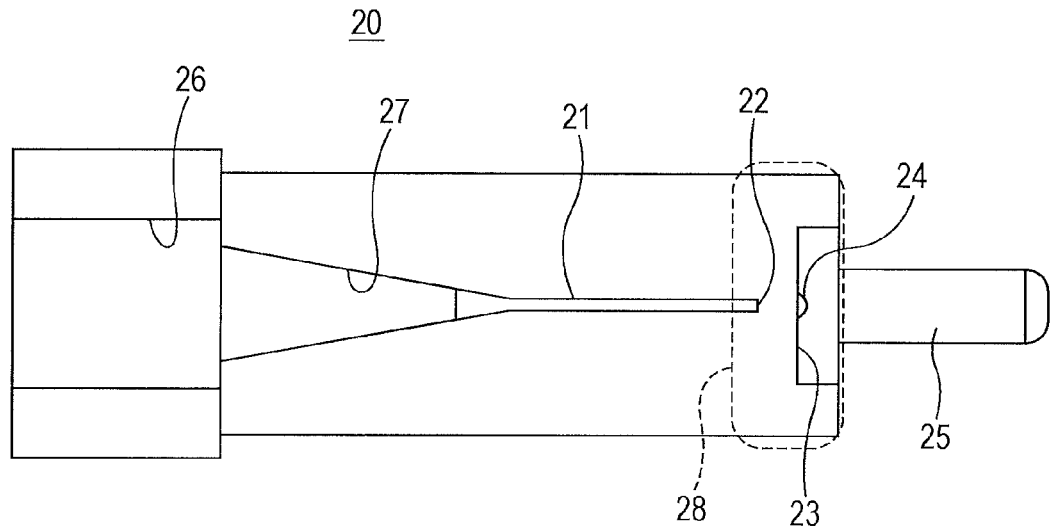

FIGS. 2A and 2B illustrate a connector main body used in an embodiment. FIG. 2A is a perspective view, and FIG. 2B is a side view along a transmission direction of a light. The connector main body 20 has a slit 26 for a rubber boot receiving a rubber boot (refer to FIGS. 7A and 7B) holding the optical waveguide, a tapered portion 27 leading to the slit 26 for a rubber boot, and a slit (insertion hole) 21 for an optical waveguide extending from the tapered portion 27. The tapered portion 27 has a cross sectional shape easy to guide the optical waveguide inserted from the slit 26 for a rubber boot to the slit 21 for an optical waveguide. The far end of the slit 21 for an optical waveguide is a slit bottom 22.

At a tip end portion 28 on an opposite side of the slit 26 for a rubber boot of the connector main body 20, a cavity 23 is formed. In the cavity 23, at a position facing the bottom 22 of the slit 21 for an optical waveguide (backside of a contact face 31), a microlens 24 is disposed. In a case of configuring an optical connector by implementing an optical waveguide (refer to FIG. 3) in the connector main body 20, the optical connector is often connected facing an optical connector of the same type. Accordingly, the microlens 24 is disposed in the cavity 23 not to make contact with the other connector.

A portion to be an optical path out of the tip end portion 28 including a region at least from the bottom 22 of the slit to the microlens 24 in the connector main body 20 is formed with a translucent material. In the embodiment, the connector main body 20 is formed with a translucent material by injection molding. As the translucent material, a thermoplastic resin, such as PEI (polyetherimide), PC (polycarbonate), and COP (cyclo-olefin polymer), or a thermosetting resin, such as epoxy, are desired, for example. At this time, the microlens 24 may also be formed integrally using a translucent material same as the material for the connector main body 20.

On a connection face 29 of the connector main body 20 with the other connector, positioning pins 25 are disposed. The positioning pins 25 may be molded integrally with the connector main body 20. Although the connector main body 20 is equipped with the positioning pins 25 in this example, they may also be in any form as long as having a configuration capable of fitting to the other connectors. For example, they may also be projections in another shape and may also be positioning bores or recesses.

Figure 3:
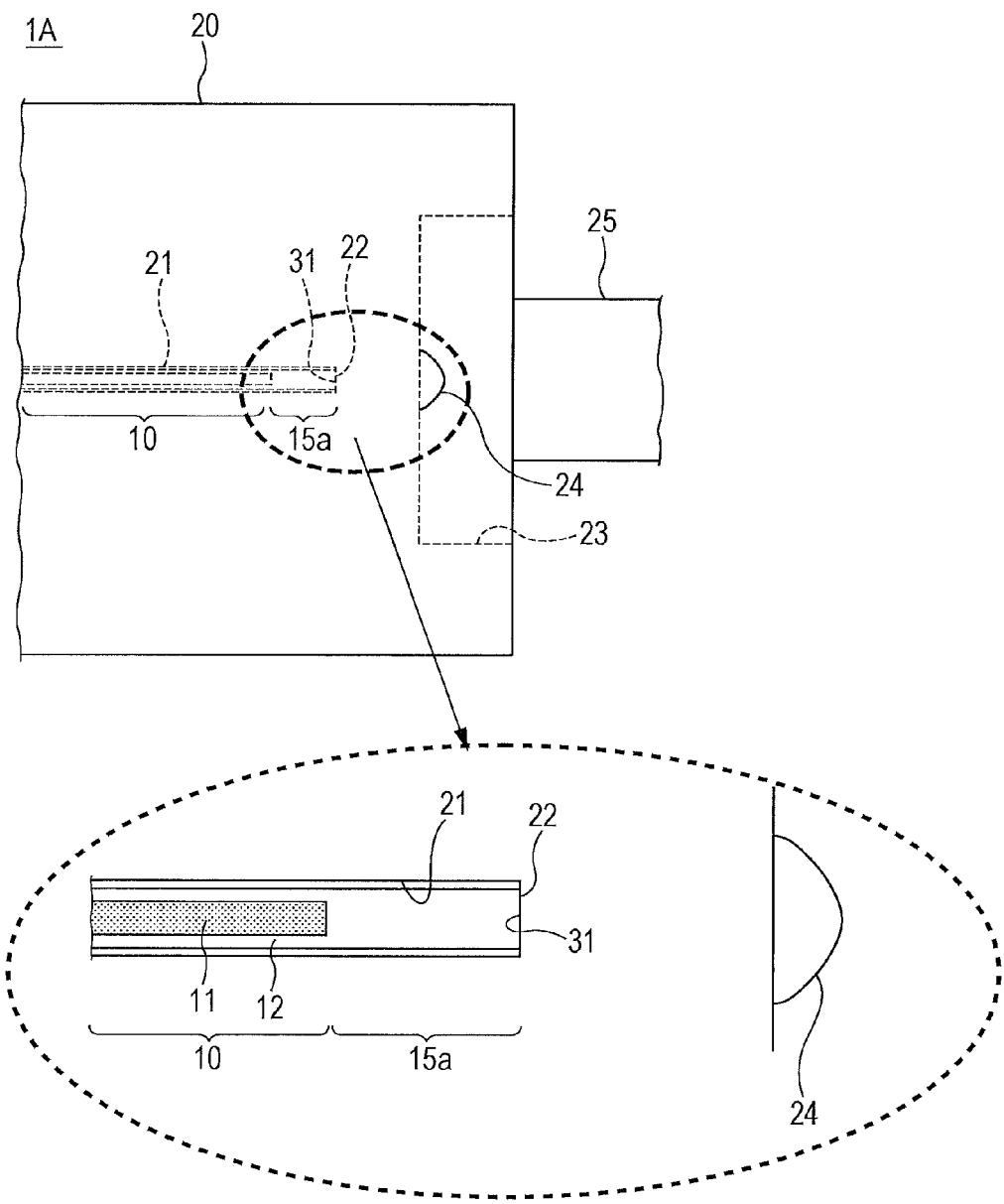
FIG. 3 illustrates a configuration of an optical transmission path in the embodiment.

FIG. 3 illustrates a configuration of an optical transmission path 1A in the embodiment. The optical transmission path 1A has the connector main body 20 having the slit 21 for an optical waveguide, an optical waveguide 10 accommodated in the slit 21 for an optical waveguide, and a transparent member 15a covering the core end face at a tip end of the optical waveguide 10 in the insertion direction.

The optical waveguide 10 is provided with a core 11 equipped in a central axis region and a clad 12 equipped on an outer periphery of the core 11 and having a refractive index smaller than that of the core 11. A tip end face of the transparent member 15a in the insertion direction abuts on the bottom 22 of the slit 21 for an optical waveguide to make contact with the connector main body 20. This abutting face is referred to as a contact face 31.

A case where a signal light propagates in a direction same as the insertion direction of the optical waveguide 10 is considered. In this case, the end face on a tip end side of the insertion direction of the core 11 becomes a light emitting surface. The light having propagated in the core 11 while repeating total reflection enters into the transparent member 15a from the end face of the core 11.

Since the transparent member 15a is not equipped with a light confinement member, the light having exited from the end face of the core 11 propagates in the transparent member 15a while enlarging the light diameter. The refractive index of the transparent member 15a may be close to the refractive index of the core 11 and the refractive index of the microlens 24 because of the relationship with the excess loss due to the Fresnel reflection. This is described later with reference to FIGS. 5 and 6.

In the example of FIG. 3, the transparent member 15a is continuously formed with a material same as the material of the clad 12 of the optical waveguide 10. Accordingly, the refractive index of the transparent member 15a becomes slightly (for example, approximately from 1% to 3%) smaller than the refractive index of the core 11.

The microlens 24 in the cavity 23 at the tip end of the connector main body 20 collects or collimates the light exited from the core 11. In a case that the member on the other side of connection of the optical connector has a waveguide configuration same as the configuration of the optical waveguide 10, the microlens 24 is formed as a collimating lens.

Figure 4:
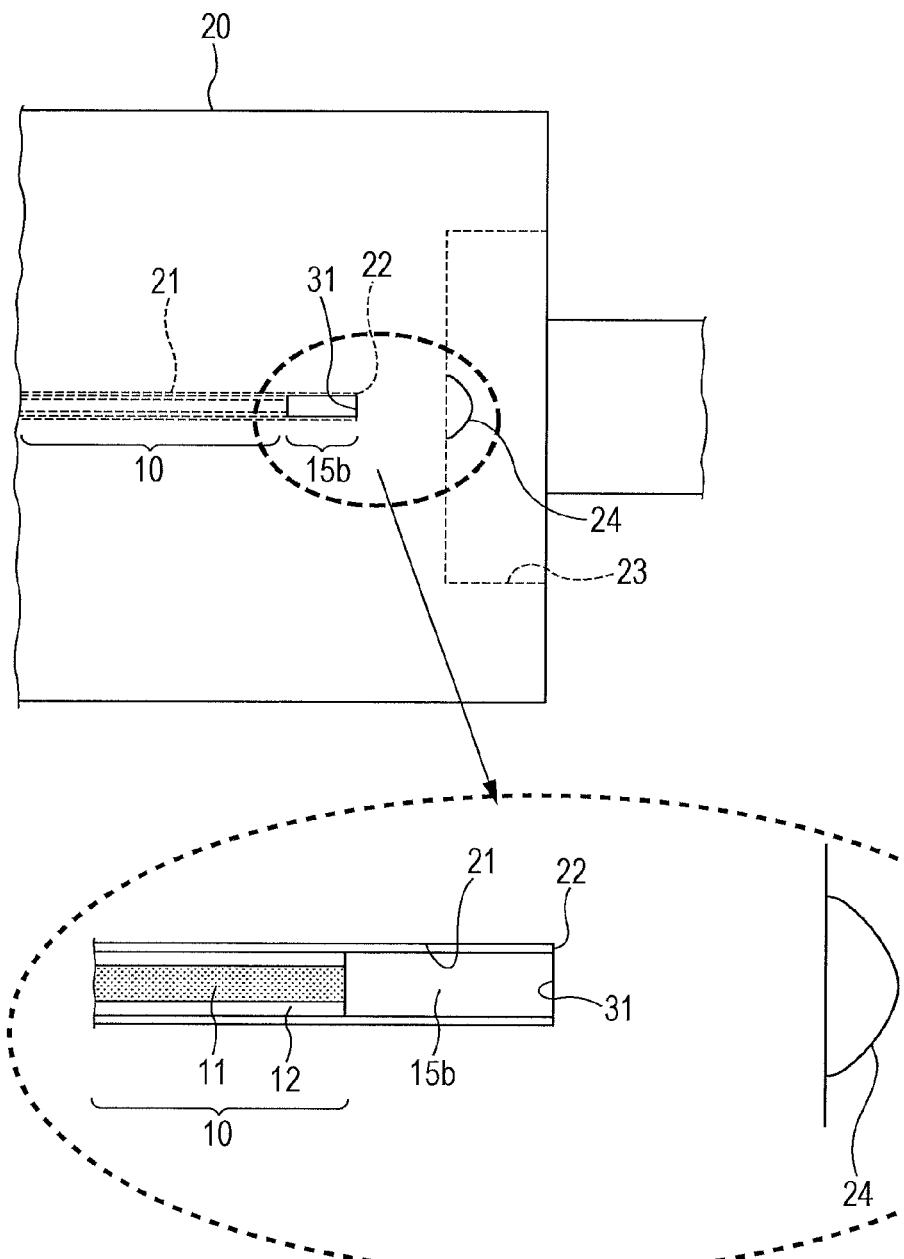
FIG. 4 illustrates a modification of a transparent member used for the optical transmission path.

FIG. 4 illustrates a modification of a transparent member 15 used for the optical transmission path 1A. A transparent member 15b used in FIG. 4 is not integrally formed with the clad 12 of the optical waveguide 10 but formed with a separate member and is joined covering a core end face of the optical waveguide 10. The transparent member 15b is preferably formed with a material having a refractive index approximately same as the refractive index of the core 11, and is formed with, for example, a material same as the material of the core 11.

Here, "covering" an end face of the core 11 includes not only a case of covering an end face of the core 11 directly with the transparent member 15b but also a case of laying another transparent member between the end face of the core 11 and the transparent member 15b. For example, even a case of joining the first transparent member 15a that is integrally formed with the clad 12 to cover the core end face as in FIG. 3 with the second transparent member 15b as in FIG. 4 by fusion splicing or the like is defined to be disposed "covering" an end face of the core 11.

That is, all cases that an end face of the core 11 is at a position different from the contact face 31 of the tip end side of the transparent member 15b and the connector main body 20 are included. In this case as well, the refractive indexes of the transparent member 15b and the other transparent member laying in-between are set to be equivalent to the refractive index of the core 11 (and the microlens 24) or within a predetermined range not generating an excess loss.

Figure 5:
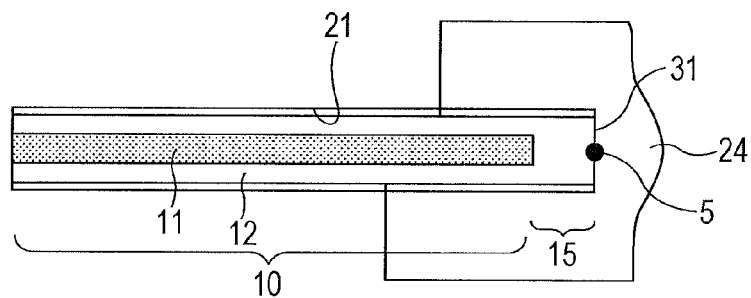
FIG. 5 illustrates actions of an optical waveguide and the transparent member.

FIG. 5 is a diagram to illustrate actions of the optical waveguide 10 and the transparent member 15 (the transparent members 15a and 15b are collectively referred to as a "transparent member 15"). The light propagated in the core 11 covered with the clad 12 exits from the core 11 to propagate in the transparent member 15. The light diameter on the contact face 31 where the transparent member 15 abuts on the optical connector main body 20 is larger than the core diameter.

As a result, even if dust 5 is mixed in a region of the contact face 31 corresponding to the core end face, the influence of the scattering is relatively small and thus the overall loss can be inhibited. The light having an enlarged diameter is collected or collimated by the microlens 24 as described above. A similar effect is also obtained in a case that the optical transmission path is a transmission path on the receiving side.

In this case, while the signal light is collected by the microlens 24 so as to enter into the core 11, the light diameter on the contact face 31 is larger than the light diameter on the end face of the core 11, so that even if the dust 5 is mixed thereto, the light can be guided to the core 11 in a state of relatively small influence on the scattering due to the dust 5.

Figure 6:
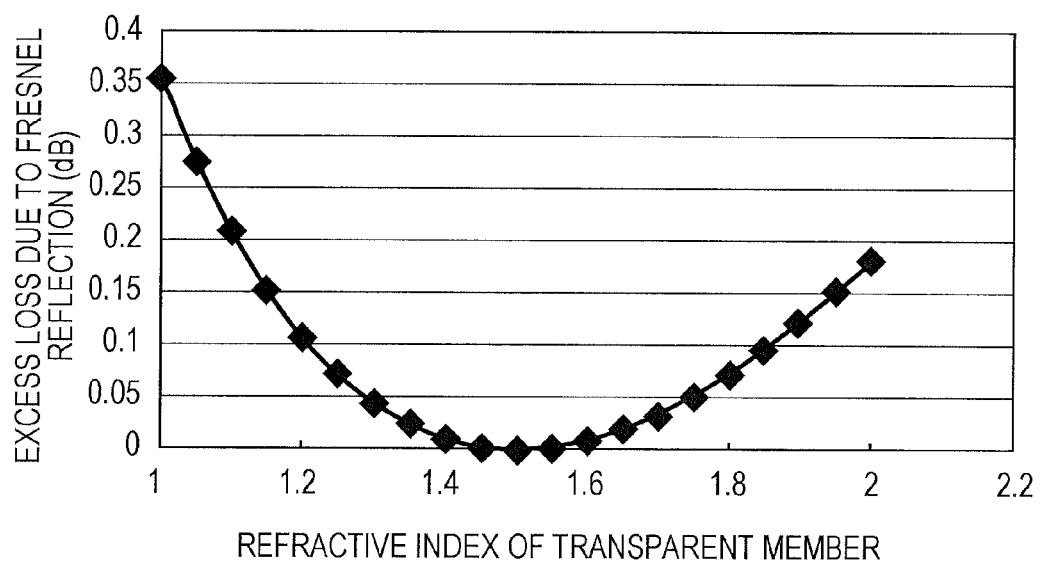
FIG. 6 illustrates relationship of a refractive index of the transparent member and an excess loss due to Fresnel reflection.

FIG. 6 is a graph illustrating relationship of the refractive index of the transparent member 15 and the excess loss due to the Fresnel reflection. The Fresnel reflection is reflection generated at an interface having a discontinuous refractive index, which causes an excess loss. To avoid Fresnel reflection, the difference in the refractive indexes of the core 11, the transparent member 15, and the microlens 24 (and a translucent material at the tip end portion 28 of the connector main body 20 integrally formed with the microlens 24) is desired to be smaller.

In FIG. 6, in a case that the refractive index of the core 11 to a light having a wavelength of 850 nm is 1.5 and the refractive index of the microlens 24 (and a transparent material at the tip end portion 28 of the connector main body 20) is 1.5, an excess loss (dB) generated between the core 11, the transparent member 15, and the microlens 24 (and the tip end portion 28 integrally formed therewith) is measured by varying the refractive index of the transparent member 15.

As seen from the graph, the refractive index of the transparent member 15 is from 1.2 to 1.85, to allow the influence of the loss due to the reflection to be negligible, and preferably from 1.3 to 1.75. A more preferable configuration is a configuration where the refractive index of the transparent member 15 is set equivalent to the refractive index of the core 11.

For example, in a case of forming the transparent member 15b in the configuration in FIG. 4 with a material same as the material for the core 11 or a material having a refractive index approximately same as the refractive index of the core 11 for fusion splicing on the end face of the core 11, almost no excess loss is generated. Thus, considering the excess loss due to the Fresnel reflection, the refractive index of the transparent member 15 is set so as to make the difference between the refractive indexes of the transparent member 15 and the core 11 within a range of 20% or less of the refractive index of the core 11, more preferably within a range of 15% or less, and even more preferably approximately equal to the refractive index of the core 11.

Figure 7A:
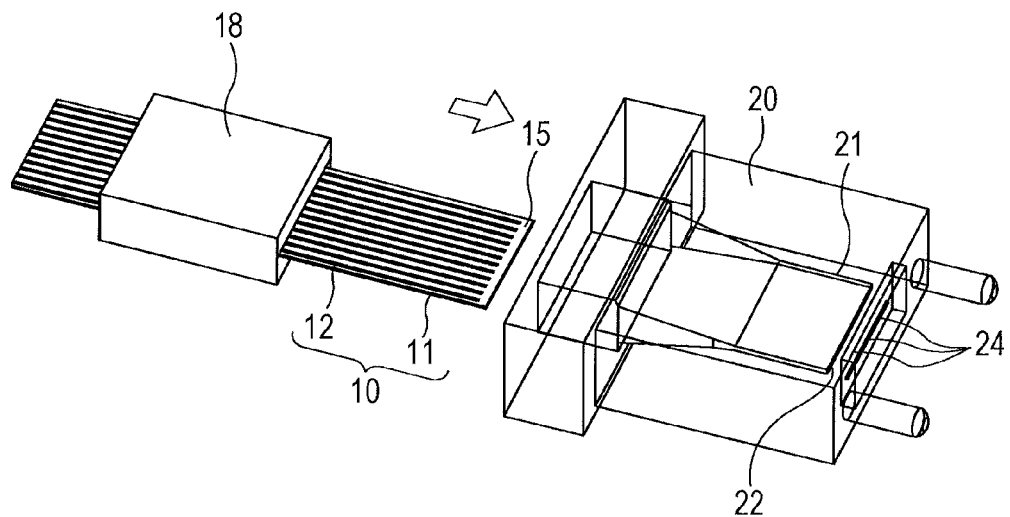
FIGS. 7A and 7B illustrate an assembly example of an optical connector having the optical transmission path of the embodiment.
Figure 7B:
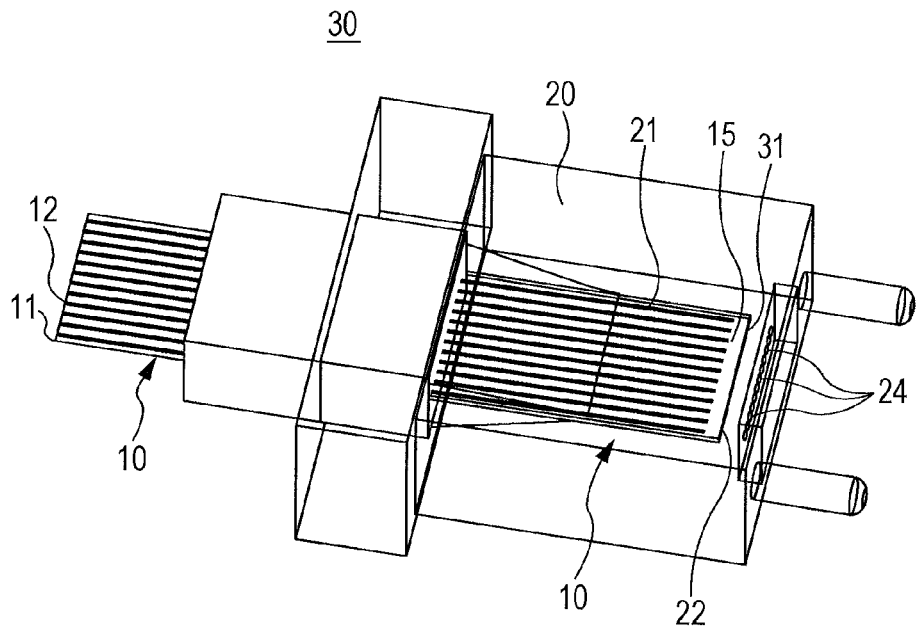

FIGS. 7A and 7B are diagrams illustrating an assembly example of an optical connector 30 having the optical transmission path in FIG. 3 or 4. As illustrated in FIG. 7A, the transparent member 15 covering end faces of a plurality of cores 11 is disposed at a tip end in an insertion direction (direction of the arrow) of the optical waveguide 10 having the cores 11 and the clads 12 coating outer peripheries of the cores 11.

An adherent (not illustrated) is applied on tip end portions of the transparent member 15 and the optical waveguide 10, and the optical waveguide 10 is sandwiched with a rubber boot 18, and the tip end side of the optical waveguide 10 is inserted into the slit 21 for an optical waveguide.

As illustrated in FIG. 7B, as the optical waveguide 10 is inserted thoroughly into the connector main body 20, the transparent member 15 is pressed against the bottom 22 of the slit 21 for an optical waveguide to configure the contact face 31 with the connector main body 20. In this state, heat or ultraviolet rays (UV) is irradiated to cure the adherent and thus the optical waveguide 10 is fixed to the connector main body 20. In the example of FIGS. 7A and 7B, a plurality of microlenses 24 is disposed at positions facing the plurality of cores 11. A light having exited from each core 11 propagates in the transparent member 15 while enlarging the light diameter and is collimated in the corresponding microlens 24 to propagate to a waveguide on the other side of connection.

Figure 8A:
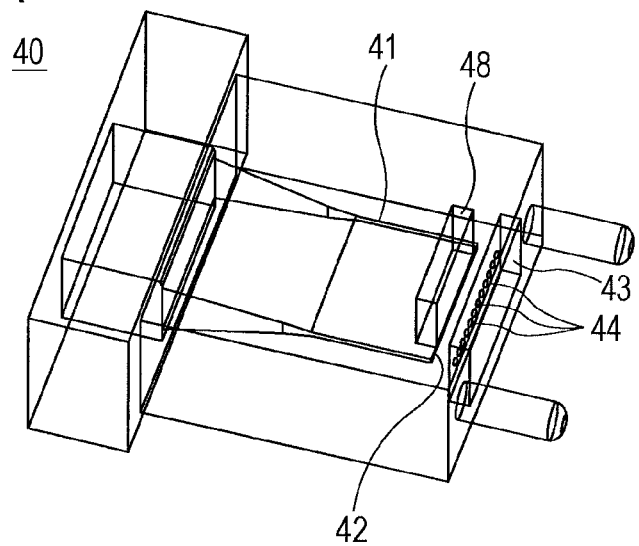
FIGS. 8A through 8C illustrate Modification 1 of a connector main body.
Figure 8B:
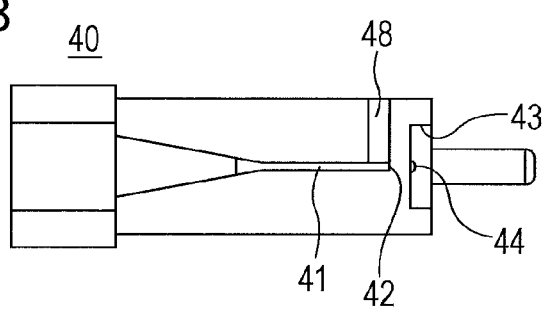
Figure 8C:
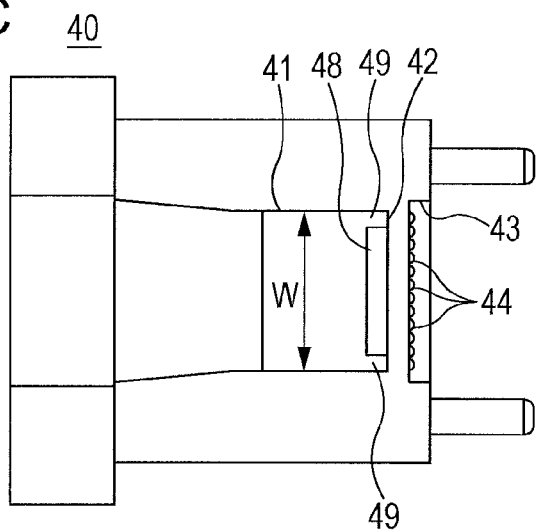

FIGS. 8A through 8C are diagrams illustrating Modification 1 of a connector main body. FIG. 8A is a perspective view, FIG. 8B is a side view, and FIG. 8C is a top view. A connector main body 40 in Modification 1 has an air void 48 connecting outside of the connector main body 40 near a bottom 42 of a slit 41 for an optical waveguide. In the example of FIGS. 8A through 8C, the air void 48 extends in communication with the slit 41 for an optical waveguide in a direction orthogonal to the slit 41 for an optical waveguide at the slit bottom 42.

The air void 48 is formed across a width smaller than a width W of the slit 41 for an optical waveguide. When the optical waveguide 10 is inserted, walls 49 on both sides of the air void 48 restrain the tip end portion of the optical waveguide 10 including the transparent member 15 from turning up inside the air void 48. This enables the cores 11 of the optical waveguide 10 inserted into the slit 41 for an optical waveguide to be positioned correctly relative to the arrangement of a plurality of microlenses 44 disposed in a cavity 43.

Figure 9:
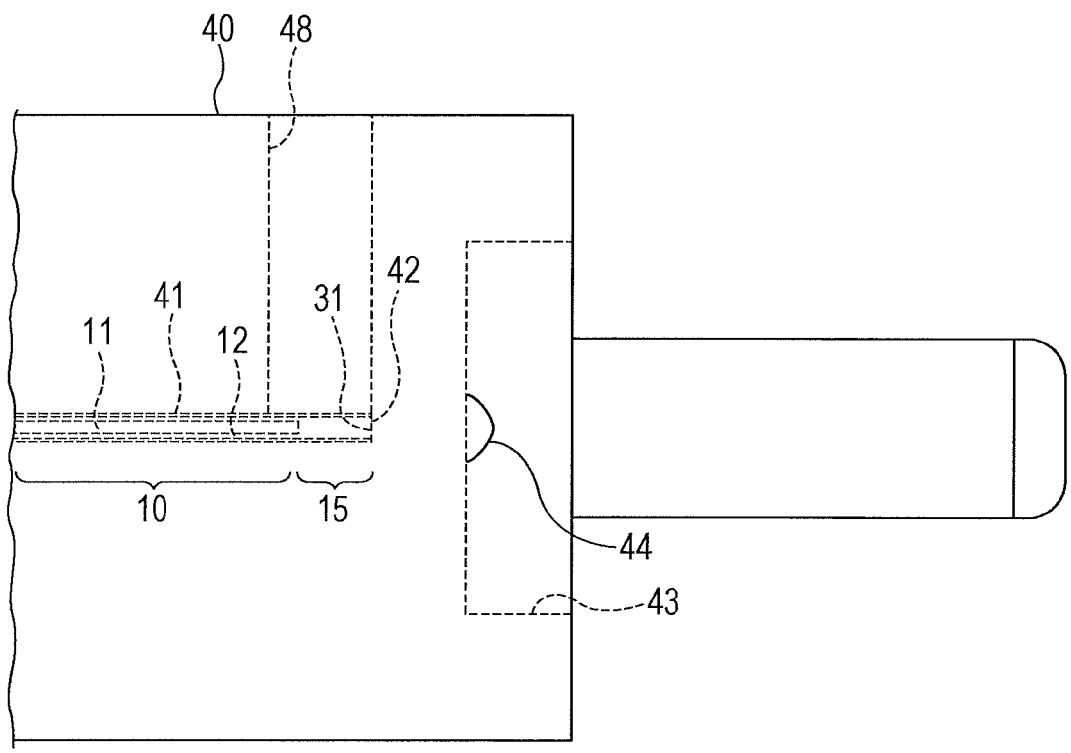
FIG. 9 illustrates an optical transmission path when using the connector main body of Modification 1.

FIG. 9 is a diagram illustrating an optical transmission path 1B in a case of using the connector main body 40 in FIGS. 8A through 8C. The optical transmission path 1B has, similar to the optical transmission path 1A in FIG. 3 or 4, the optical waveguide 10 inserted into the slit 41 for an optical waveguide of the connector main body 40, the transparent member 15 equipped at a tip end portion of the optical waveguide 10 in an insertion direction, and the contact face 31 where the transparent member 15 abuts on the slit bottom 42 of the connector main body 40.

The optical waveguide 10 includes the cores 11 and the clads 12 coating outer peripheries of the cores 11, and the refractive index of the transparent member 15 is set to be approximately same as the refractive index of the cores 11 or to make a difference in the refractive indexes 20% or less of the refractive index of the cores 11.

Tip end portions of the transparent member 15 and the optical waveguide 10 are positioned within the air void 48. As described with reference to FIGS. 8A through 8C, due to the presence of walls 49 on both sides of the air void 48, the tip end of the optical waveguide 10 including the transparent member 15 is positioned correctly relative to the microlenses 44. This enables lights having exited from the cores 11 have a light diameter on the contact face 31 larger than the light diameter on exit surfaces of the cores 11. The lights with an enlarged light diameter enter into the microlenses 44 to be collimated.

Figure 10A:
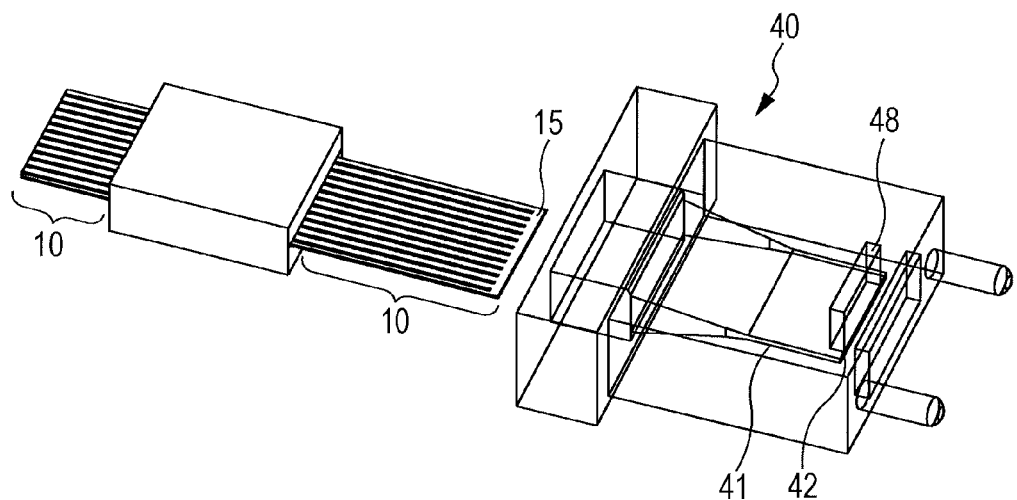
FIGS. 10A and 10B illustrate an assembly example when using the connector main body of Modification 1.
Figure 10B:
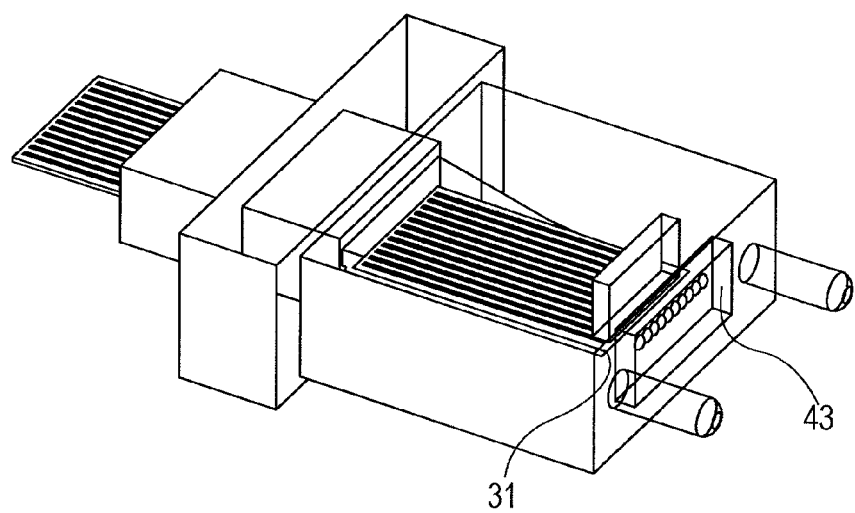

FIGS. 10A and 10B are diagrams illustrating an assembly example of using the connector main body 40 in FIGS. 8A through 8C. In FIG. 10A, an adherent is poured into the slit 41 for an optical waveguide of the connector main body 40 in advance.

Since the air void 48 connecting to the outside is formed in the connector main body 40, flow of the adherent becomes better. In this configuration, the adherent does not have to be applied on the sides of the transparent member 15 and the optical waveguide 10. Accordingly, the assembly step is facilitated and the time for the step can be reduced.

FIGS. 11A and 11B illustrate Modification 2 of a connector main body. FIG. 11A is a perspective view and FIG. 11B is a side view. A connector main body 50 of Modification 2 has a partially removable configuration. The connector main body 50 has a base portion 50A on a side of inserting the optical waveguide 10 and a tip end portion 50B on a tip end side in an insertion direction, and the base portion 50A and the tip end portion 50B are configured to be coupleable by positioning pins 55.

In the base portion 50A, a slit 51 for an optical waveguide, an air void 58 extending in a direction orthogonal from the slit 51 for an optical waveguide, and pin bores 59a are formed. The tip end portion 50B has a coupling face 52 coupled to the base portion 50A, and on a surface opposite to the coupling face 52, a cavity 53 and an arrangement of microlenses 54 are formed. At positions corresponding to the pin bores 59a in the base portion 50A, pin bores 59b are formed.

Figure 12A:
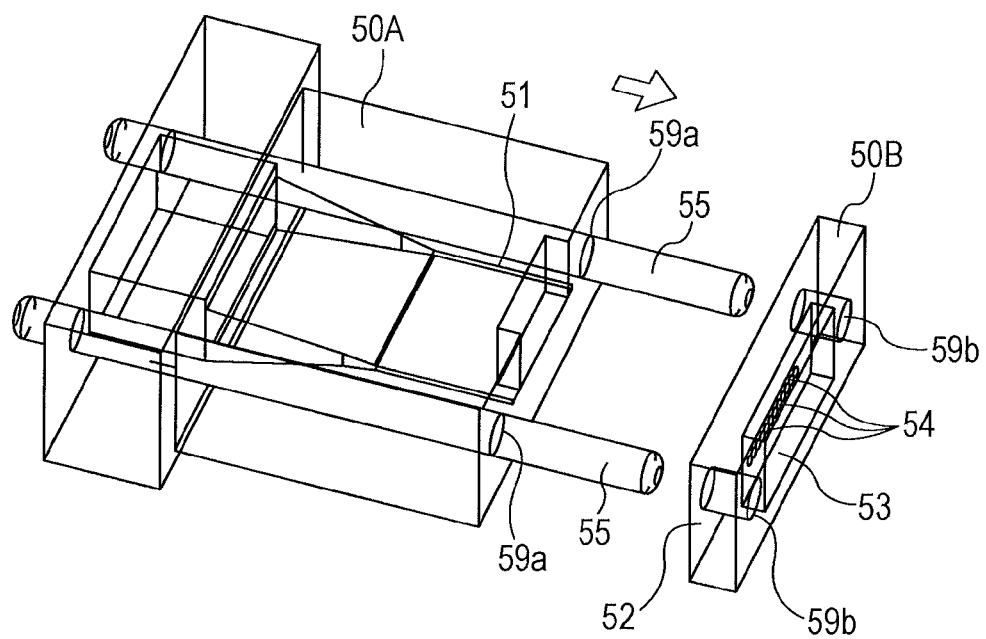
FIGS. 12A and 12B illustrate an assembly example when using the connector main body of Modification 2.
Figure 12B:
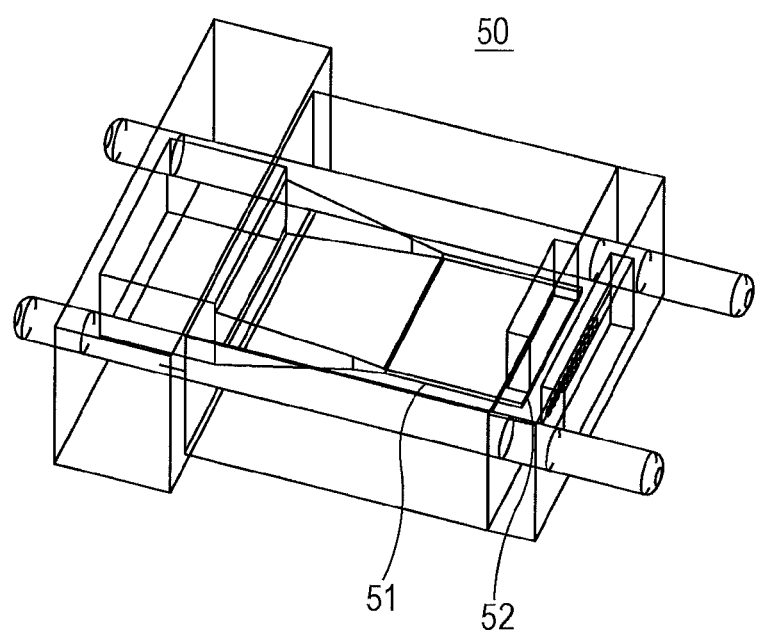

FIGS. 12A and 12B are diagrams illustrating an assembly example of the connector main body 50. By inserting the positioning pins 55 into the pin bores 59a of the base portion 50A and the pin bores 59b of the tip end portion 50B, they can be integrally coupled. By coupling, the coupling face 52 of the tip end portion 50B abuts on an opening of the slit 51 for an optical waveguide in the base portion 50A to be a slit bottom 52.

By allowing the connector main body 50 to be separated into two parts, the tip end portion 50B can be replaceable. Within the connector main body 50, the tip end portion 50B includes the arrangement of the microlenses 54 with a problem of degradation in precision. In a case of degradation in a lens function of any of the microlenses 54, not by replacing the entire connector main body 50 but by replacing the tip end portion 50B only, the quality of the connector can be maintained inexpensively and easily.

Even in a case of changing a connector to be connected due to a connection change between LSI chips, boards, or the like, proper measures can be taken flexibly by replacing only the tip end portion 50B with a tip end portion of a different lens design. Manufacture of a die for injection molding is also facilitated.

Figure 13A:
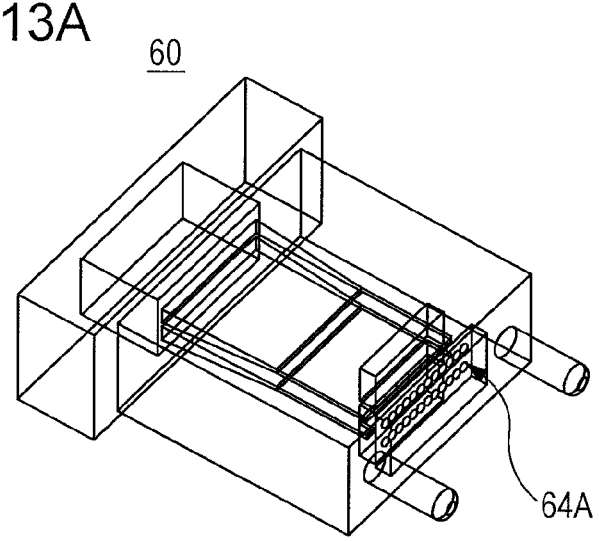
FIGS. 13A through 13C illustrate Modification 3 of a connector main body.
Figure 13B:
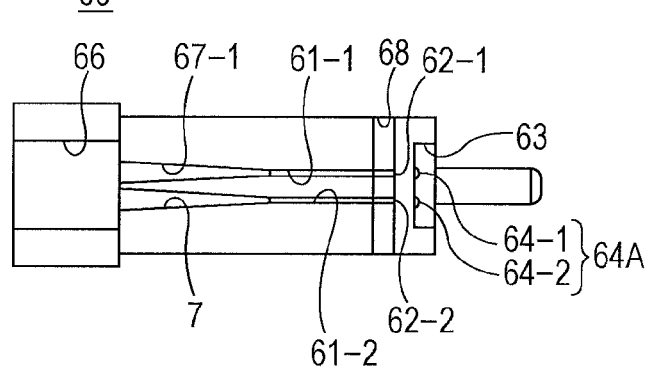
Figure 13C:
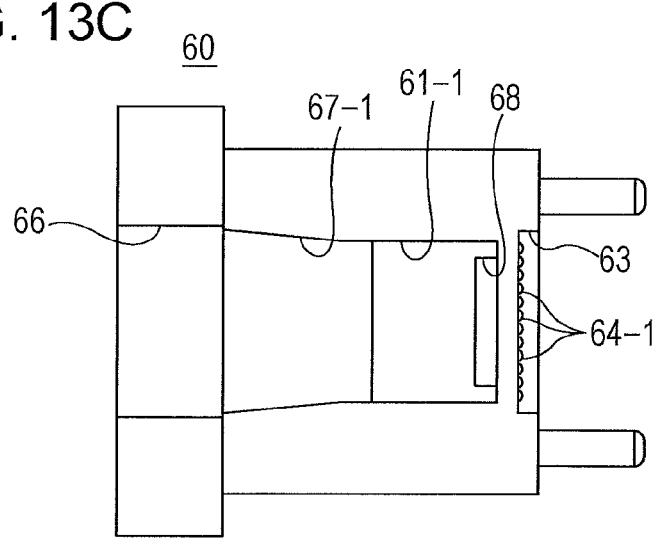

FIGS. 13A through 13C illustrate Modification 3 of a connector main body. FIG. 13A is a perspective view, FIG. 13B is a side view, and FIG. 13C is a top view. A connector main body 60 of Modification 3 has slits 61-1 and 61-2 for an optical waveguide (collectively referred to as "slits 61 for an optical waveguide") disposed in two stages.

Two tapered portions 67-1 and 67-2 extend from a slit 66 for a rubber boot, and the slits 61-1 and 61-2 for an optical waveguide are formed corresponding to each. An air void 68 is in communication with both of the slits 61-1 and 61-2 for an optical waveguide to be connected to an ambient air. The far ends of the slits 61-1 and 61-2 for an optical waveguide are slit bottoms 62-1 and 62-2.

In a cavity 63 of the connector main body 60, arrays 64A of microlenses including arrangements 64-1 and 64-2 of microlenses are equipped corresponding to the slits 61-1 and 61-2 for an optical waveguide. By forming the slits 61 for an optical waveguide in multi stages, a signal can be transmitted in more channels. The number of stages of slits is not limited to two stages and may be any number of stages, such as three stages or four stages, in accordance with the size (height or thickness) of the connector main body 60.

Figure 14:
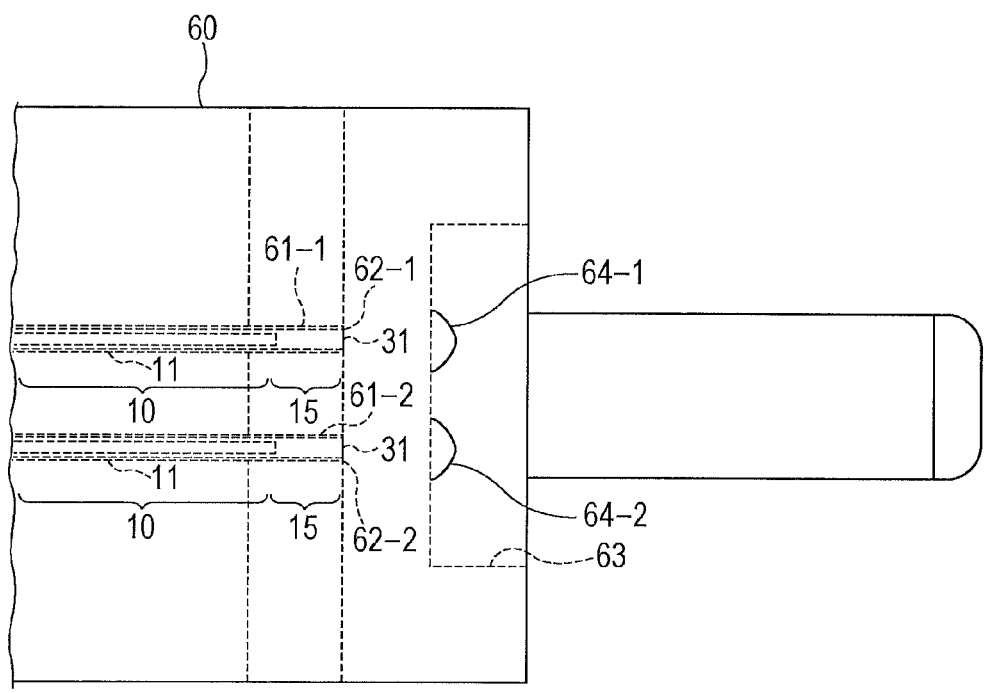
FIG. 14 illustrates an optical transmission path when using the connector main body of Modification 3.

FIG. 14 is a diagram illustrating an optical transmission path 1C when using the connector main body 60 in FIGS. 13A through 13C. The optical transmission path 1C has the connector main body 60 having the plurality of slits 61-1 and 61-2 for an optical waveguide formed therein, optical waveguides 10 inserted into each of the slits 61-1 and 61-2 for an optical waveguide, and transparent members 15 covering end faces of the cores 11 of the optical waveguides 10, and tip end faces of the transparent members 15 in an insertion direction abuts on the connector main body 60 on slit bottoms 62 to define the contact faces 31. The end faces of the cores 11 are positioned backward from the contact faces 31 viewed from a tip end portion of the connector main body 60.

Even in a case that dust (not illustrated) is mixed into each stage of the slits 61-1 and 61-2 for an optical waveguide in the assembly step, this configuration can suppress the influence of scattering as low as allowing to be negligible due to enlargement of the light diameter via the transparent members 15. Even in a case of a more number of channels, the influence of dust can be inhibited in any channel, so that the scattering inhibition effect increases as the number of channels increases.

Figure 15A:
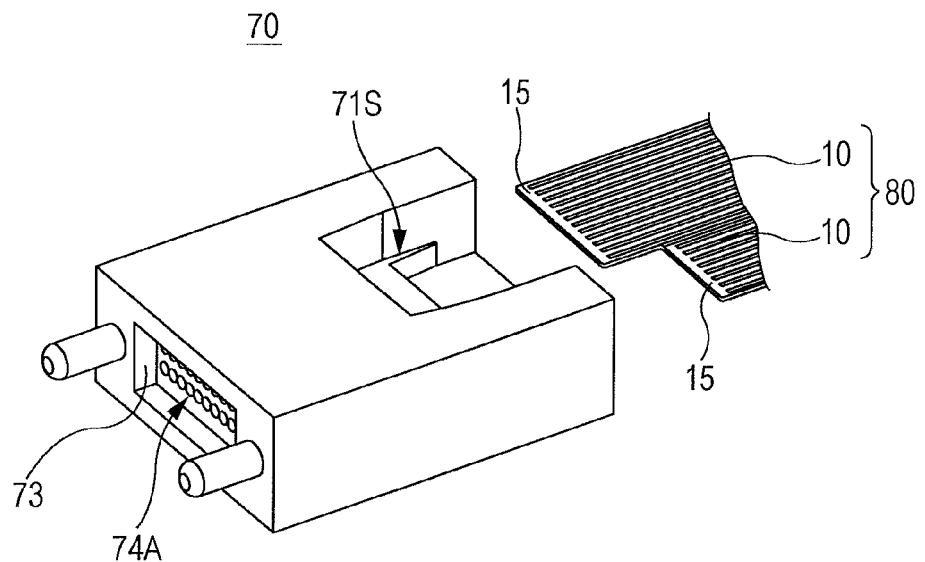
FIGS. 15A and 15B illustrate Modification 4 of a connector main body.
Figure 15B:
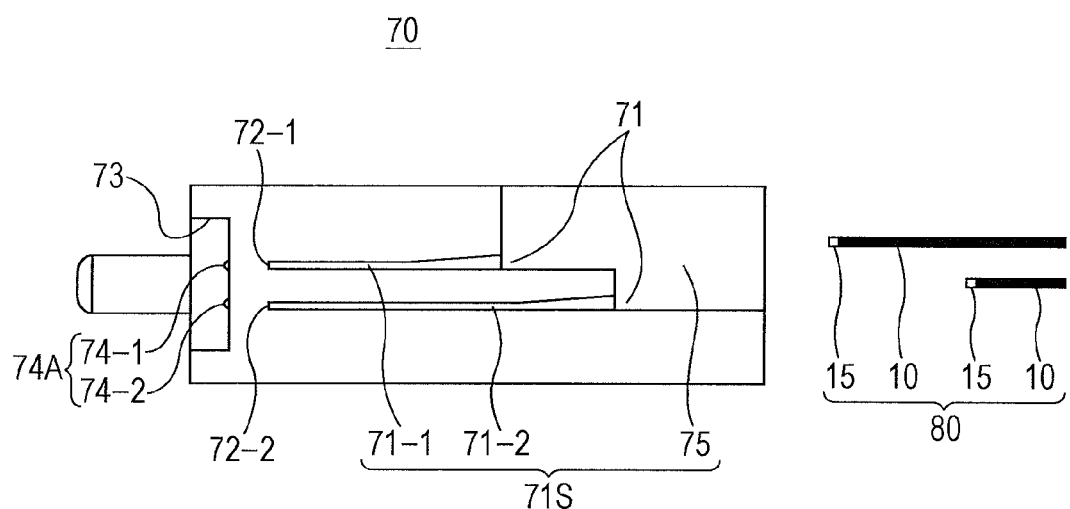

FIGS. 15A and 15B illustrate Modification 4 of a connector main body. FIG. 15A is a perspective view, and FIG. 15B is a side view. A connector main body 70 of Modification 4 has stepped slits 71S for an optical waveguide. The stepped slits 71S for an optical waveguide include a stepped insertion opening 75 receiving waveguide arrays 80 and a plurality of slits 71-1 and 71-2 for an optical waveguide (collectively referred to as "slits 71 for an optical waveguide") extending from the stepped insertion opening 75 in a direction of a tip end of the connector main body 70.

Lengths of the slits 71-1 and 71-2 for an optical waveguide are formed in different lengths in accordance with the shape of the stepped insertion opening 75. The connector main body 70 has a cavity 73 on a tip end side of the optical waveguides 10 in the insertion direction and has arrays 74A of microlenses in the cavity 73.

Each of the slits 71-1 and 71-2 for an optical waveguide is formed with one of main walls along an insertion direction being flat and the other being in a tapered shape. Tapering off one side of the slit shapes facilitates the plurality of optical waveguides 10 configuring the waveguide arrays 80 to be inserted. Regardless of the configuration, such as the presence of a rubber boot and a shape thereof, on a side of the optical waveguides 10, the connector main body 70 may be used. Further, introduction of the adherent into the slits 71 for an optical waveguide is facilitated.

Similar to Modifications 1 through 3, the transparent member 15 is equipped at a tip end on a side of inserting each optical waveguide 10, the transparent members 15 are pressed against slit bottoms 72-1 and 72-2 to form contact faces, and microlenses 74-1 and 74-2 are disposed at positions corresponding to the contact faces.

FIGS. 16A through 16E are fabrication process diagrams of an optical waveguide with transparent members according to an embodiment. Firstly, as illustrated in FIG. 16A, a lower clad layer 91 is disposed on a substrate not illustrated. The lower clad layer 91 is, for example, a laminated film 91 of a polymer material. As the polymer material, an appropriate material, such as epoxy, polycarbonate, a siloxane resin, polyimide, and acryl, may be selected, and a material having a refractive index smaller than the refractive index of the cores may also be selected. The refractive index of the polymer material may be controlled by controlling an amount of introducing substituent groups. In this example, an epoxy resin having a refractive index of 1.55 is used. Although a thickness of the lower clad layer 91 is not particularly limited, the thickness is, for example, approximately from 5 to 30 μm, and in this embodiment, one having 25 μm is used.

Next, as illustrated in FIG. 16B, a core layer 92 is formed on the lower clad layer 91. The core layer 92 is a translucent layer having a refractive index larger than that of the lower clad layer 91, and in this example, the core layer 92 is formed with a photosensitive polymer material. For example, there are methods of applying a liquid photosensitive polymer material on the lower clad layer 91 by spin coating or the like and a method of bonding a photosensitive resin film.

As the polymer material for the core layer 92, an epoxy resin, an acrylic resin, a siloxane resin, a polyimide resin, and the like, for example, may be used. In this example, a thermosetting resin film of epoxy having a refractive index of 1.58 is vacuum laminated in a predetermined pressure condition to form the core layer 92. The thickness of the core layer 92 is not particularly limited, and for example, is from 20 to 50 μm, and in this embodiment, is defined to be 50 μm.

Next, as illustrated in FIG. 16C, the core layer 92 is exposed via a photomask in a predetermined opening pattern to go through a development process, thereby forming the cores 11 disposed at predetermined intervals on the lower clad layer 91. In this example, the cores 11 are patterned to have a pitch (distance between centers) of 250 μm and have a cross-section of 50×50 μm. At both longitudinal ends of the lower clad layer 91, laminate regions 94 having no pattern of the cores 11 formed therein are equipped.

Next, as illustrated in FIG. 16D, by covering the lower clad layer 91 and the cores 11, an upper clad layer 93 is formed to form a laminate product. The upper clad layer 93 may be made in a method of applying a material same as the material for the lower clad layer 91 by spin coating or the like or a method of curing by a light or heat after bonding a resin film. In this example, the upper clad layer 93 has a thickness of, for example, 25 μm and the upper clad layer 93 is bonded by pressure bonding, followed by being baked at 200° C. for curing.

Finally, as illustrated in FIG. 16E, the laminate regions 94 are cut in an appropriate area by dicing. The cut positions are positions away from the longitudinal ends of the cores 11 by a predetermined distance. This enables to complete a transmission path member having end faces of the cores 11 of the optical waveguide 10 covered with the transparent member 15. In this example, the longitudinal length from an end face of the cores 11 to the cut face is, for example, from 100 to 500 μm. However, the length of the transparent member 15 in a direction along the optical axis may be set to be any length as long as falling within a range capable of enlarging the light diameter without interfering adjacent channels (cores 11).

The optical waveguide 10 with the transparent member 15 thus fabricated is inserted into a slit for an optical waveguide of a connector main body to bring the transparent member 15 at the tip end. The transparent member 15 abuts on the slit bottom to make a contact face, thereby allowing the optical transmission paths 1A, 1B, and 1C described above to be fabricated without polishing.

Although the transparent member 15 is integrally formed with a material same as the material for the clads 12 in the example of FIGS. 16A through 16E, the optical waveguide 10 with the transparent member 15 may be fabricated, in a case of not forming integrally with the clads 12, by cutting the laminated structure in FIG. 16D so as to expose the end faces of the cores 11 and by fusion splicing the transparent member 15 separately fabricated on to the cut end faces. Alternatively, by preparing an optical waveguide having a plurality of optical fibers arranged in an array to be joined, the transparent member 15 may also be fusion spliced on the core end faces of the optical waveguide. In a case of joining the transparent member 15, it is desired to form the transparent member 15 with a material having a refractive index equivalent to that of the cores 11.

Figure 17A:
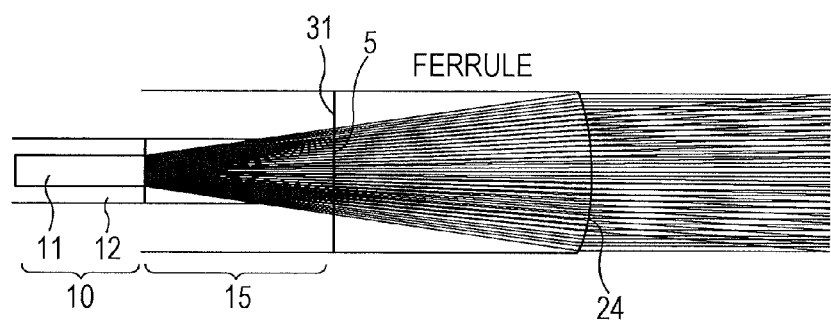
FIGS. 17A and 17B illustrate an advantage of the optical transmission path in the embodiment.
Figure 17B:
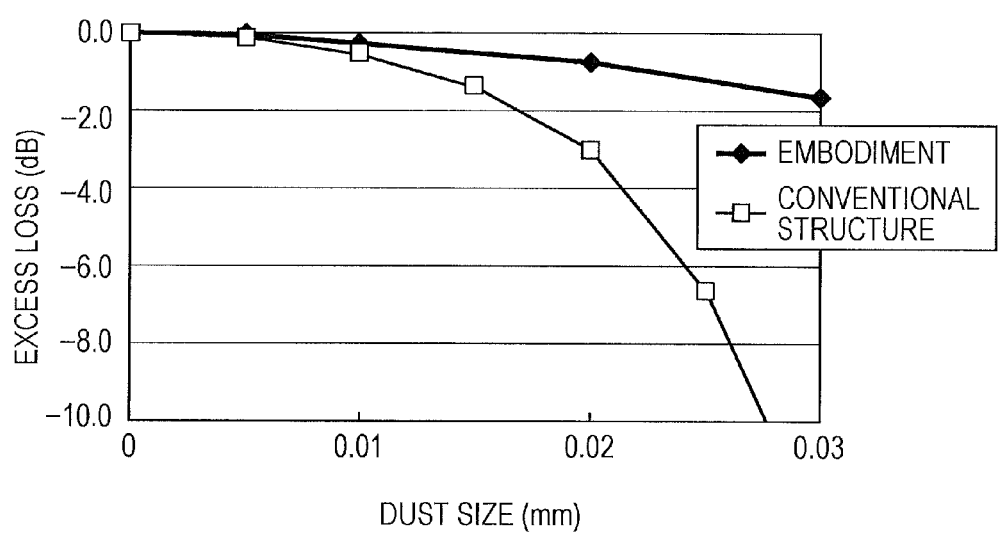

FIGS. 17A and 17B are diagrams illustrating an effect of the optical transmission path described above. FIG. 17A is a schematic diagram illustrating expansion of a light exiting from the core 11 of the optical waveguide 10 and collimation by the microlens 24. The transparent member 15 is pressed against the optical connector main body (or the ferrule) on an end face thereof to form the contact face 31. Since the light diameter on the contact face 31 is larger than the light diameter on the exit surface of the core 11, even if the dust 5 is attached inside the light diameter of the contact face 31, the influence of the scattering can be small. This schematic diagram is a model for measuring an excess loss of the optical transmission path, and the refractive index of the core 11 to a light having a wavelength of 850 nm is defined to be 1.58, a diameter or a length of one side of the end face of the core 11 to be 50 μm, the refractive index of the transparent member 15 to be 1.58, and the length of the light travel direction to be 300 μm.

Figure 1A:
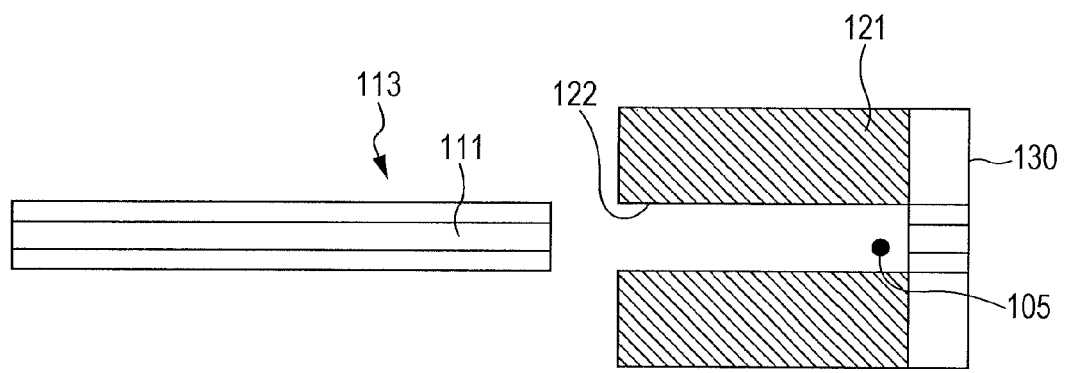
FIGS. 1A and 1B illustrate the problems.
Figure 1B:
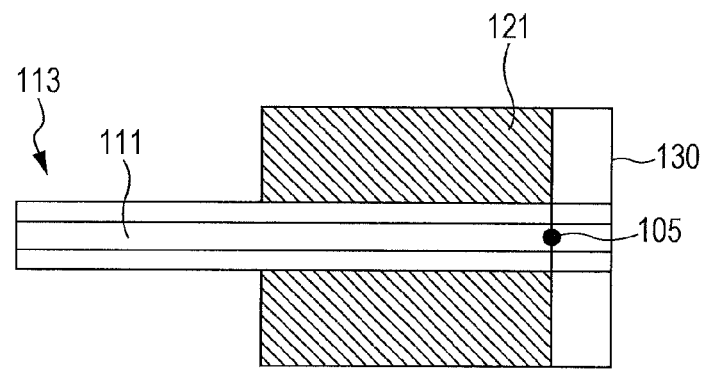

FIG. 17B is a graph illustrating an effect of loss reduction of the optical transmission path described above. The abscissa axis of the graph is a dust size (mm) and the ordinate axis is an excess loss (dB) due to the Fresnel reflection. The excess loss in the embodiment by the model in FIG. 17A is plotted with black diamond signs. The excess loss is measured by introducing dust in a variety of sizes into the optical transmission path having the above configuration. As a comparison, an optical waveguide that has a same core size and is not equipped with the transparent member 15 at a tip end is prepared to fabricate an optical transmission path having a structure in which a core end face makes direct contact with the slit bottom as in the related technique illustrated in FIGS. 1A and 1B. The excess loss of the optical transmission path having this structure is plotted with white squares.

As apparent from the graph, in this structure, the influence of the excess loss becomes non-negligible when the dust size exceeds ¼ of the core diameter, and when the dust size exceeds ⅓ of the core diameter, the excess loss rapidly increases not to allow to be used as a channel. In contrast, in the configuration of the embodiment, even in a case that dust is mixed in approximately ⅓ of the core diameter, the influence of the excess loss can be inhibited stably.

Figure 18A:
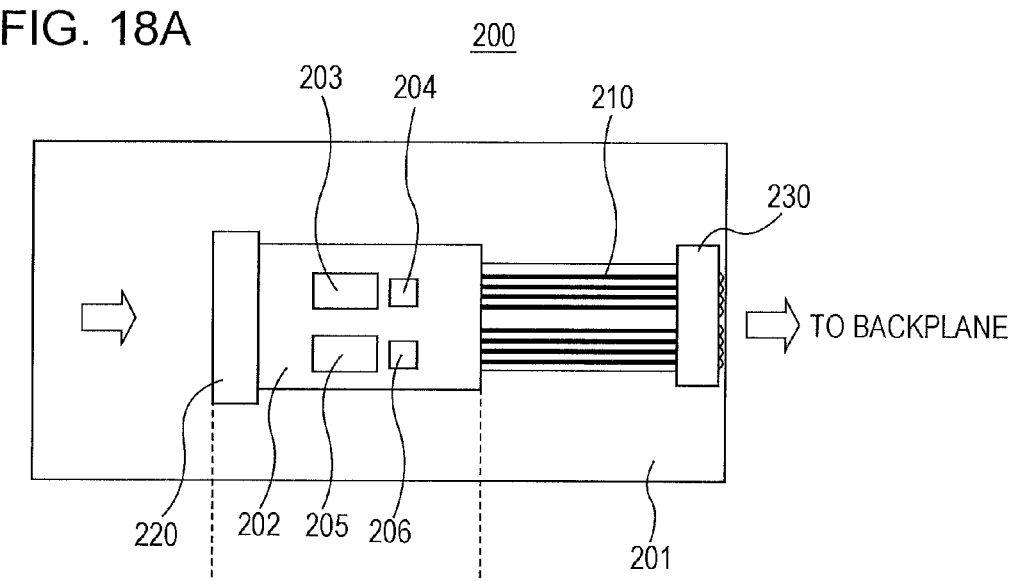
FIGS. 18A and 18B illustrate an optical module to which the optical transmission path in the embodiment is applied.
Figure 18B:
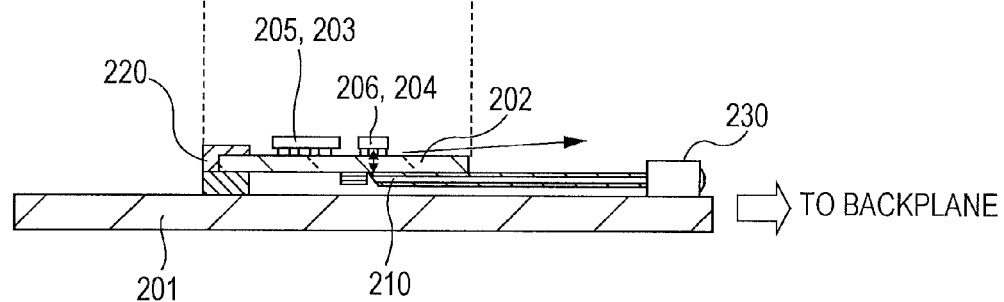

FIGS. 18A and 18B represent an example of an optical module 200 using the optical transmission path described above. FIG. 18A is a top view, and FIG. 18B is a cross sectional view along the light transmission direction. The optical module 200 is used for, for example, connecting each server blade to a backplane in a server system. The optical module 200 includes an electrical connector 220, photoelectric transducers 204 and 206 disposed on a flexible printed circuit board (FPC) 202, an optical connector 230, and an optical waveguide 210 connecting the optical connector 230 and the photoelectric transducers 204 and 206, on a connection board 201.

The optical waveguide 210 is, for example, a polymer optical waveguide and is an optical waveguide having core end faces covered with a transparent member as in FIG. 3 or 4. A tip end of the optical waveguide 210 makes contact with a hole bottom of an insertion hole, not illustrated, of the optical connector 230 and the core end faces are backward from the contact face to the FPC 202 side. The optical connector 230 employs any configuration of the connector main bodies described above.

The FPC 202 has a conductor patterned at least on an upper face, and has at least either one of the light receiving element 206 and the light emitting element 204 implemented therein with face down. The face down implementation of the light receiving element 206 and the light emitting element 204 may be achieved in a general electric device implementation method, such as a flip chip bonder. A VCSEL (vertical cavity semiconductor emission laser) array may be utilized as the light emitting element 204 and a PD (photo diode) array as the light receiving element 206. On the FPC 202, a driving IC 203 to drive the light emitting element 204, a TIA (transimped-ance amplifier) 205 to convert a current from the light receiving element 206 into a voltage, and the like may also be implemented.

For the FPC 202, a material, such as polyimide, that is thin, less in a loss of an electrical signal at the high frequency, and also transparent, is used. On a lower side of the FPC 202, a lens sheet, not illustrated, of a transparent material is bonded via an adhesive layer. On a lower side of the lens sheet, the optical waveguide 210 is bonded to couple the lights entering into the light receiving element 206 or the lights output from the light emitting element 204. The optical waveguide 210 has a mirror (not illustrated) formed therewith to bend the optical path 90 degrees.

Using such an optical module enables to configure a high speed transmission path causing a less loss.

As described above, according to the configurations and the methods in the embodiment, without using a polishing step and a clean room environment, a highly reliable optical transmission path can be fabricated at low costs. An optical module using the optical transmission path is suitable for high speed optical transmission with a reduced loss.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method comprising:
   inserting, into an optical waveguide insertion hole of a connector, an optical waveguide provided with a core, a clad equipped on an outer periphery of the core having a refractive index smaller than a refractive index of the core, a transparent member including a first transparent area configured to make contact with an end face of the core and a second transparent member area different from the first transparent area and configured to make contact with a hole bottom of the optical waveguide insertion hole; and
   pressing the optical waveguide into a hole bottom side of the optical waveguide insertion hole of the connector.

2. The method according to claim 1,
   further comprising:
   manufacturing the optical waveguide by:
      forming a lower clad layer to form a part of a clad portion on a substrate upper side,
      forming a photosensitive composition layer to form a core layer on the lower clad layer,
      processing the photosensitive composition layer in a core shape of the optical waveguide by exposing and developing, and
      forming an optical waveguide by pressure bonding an upper clad layer on the lower clad layer and the core layer and heat processing covering an exposed surface of the core layer, and
   wherein the optical waveguide is cut at a position away from the core in a predetermined distance from an end in a light transmission direction in the core.

3. The method of according to claim 1,
wherein an adherent that becomes transparent after curing is injected into the optical waveguide insertion hole of the connector before inserting the optical waveguide into the optical waveguide insertion hole of the connector.

4. A method of manufacturing an optical device, comprising:
forming an optical waveguide provided with a core, a clad equipped on an outer periphery of the core having a refractive index smaller than a refractive index of the core, and a transparent member including a first transparent area configured to make contact with an end face of the core and a second transparent member area configured to make contact with a hole bottom of a connector, wherein a contact area of the second transparent area with the hole bottom is larger than a contact area of the core with the first transparent area; and
inserting the formed optical waveguide into the connector by pressing the optical waveguide into a hole bottom side of the connector.

\* \* \* \* \*

UNITED STATES PATENT AND TRADEMARK OFFICE
CERTIFICATE OF CORRECTION

PATENT NO. : 8,882,362 B2
APPLICATION NO. : 14/184028
DATED : November 11, 2014
INVENTOR(S) : Takashi Shiraishi Page 1 of 1

It is certified that error appears in the above-identified patent and that said Letters Patent is hereby corrected as shown below:

In the Claims

Column 13, line 1, In Claim 3, after "method" delete "of".

Signed and Sealed this
Third Day of February, 2015

Michelle K. Lee
*Deputy Director of the United States Patent and Trademark Office*